Patented Aug. 26, 1947

2,426,313

UNITED STATES PATENT OFFICE 2,426,313

AZO BENZENE 4,4'-DISULFONAMIDO THIAZOLE

Bernard J. Ludwig, Bloomfield, and Franz C. Schmelkes, Montclair, N. J., assignors to Wallace & Tiernan Products Inc., a corporation of New Jersey No Drawing. Application August 6, 1941, Serial No. 405,644

2 Claims. (Cl. 260—143)

This invention relates to derivatives of azobenzene 4,4'-disulfonamide.

The compounds comprised within the invention may be considered as dimeric condensation products of an $N^1$ substituted sulfanilamide. They are of the general formula

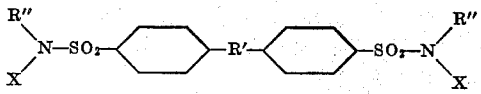

In these formulas and elsewhere herein, X represents a monovalent element that is preferably hydrogen; R' represents the hydrazo group (—NH—NH—), the azo group (—N=N—), or the azoxy group (—N=NO—) and is sometimes referred to herein as the nitrogen bridge; and R" represents a monovalent group containing carbon and hydrogen and advantageously such groups containing also nitrogen in an anil linkage (=C=N—), as, for example, the following:

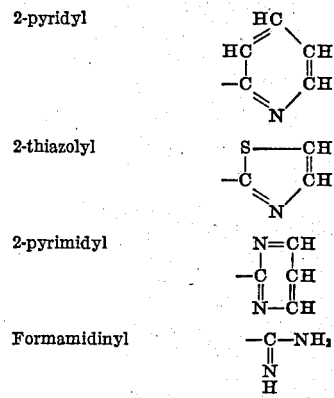

2-pyridyl 2-thiazolyl 2-pyrimidyl

Formamidinyl

The group R" is joined through a carbon atom to N in the said general formula and the carbon joined to the N is also joined to another nitrogen atom in an anil linkage (=C=N—). In formulas for each of the four residues, beginning 2-pyridyl, there is the free bond on one carbon which provides the valence for union of the carbon of R" to N in the general formula.

It is commonly understood that the 2-pyridyl group represented graphically above is resonant with a 2-pyridyl group in which the single and double bonds of the first group are interchanged, so that a large part of the 2-pyridyl group exists at all times in the structure shown and another large part in the following structure:

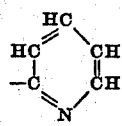

It is the latter structure which provides the carbon in the anil linkage (=C=N—), for union with N in the said general formula.

The invention comprises also the herein described method of making azo compounds of the general formula stated which includes the treatment of azobenzene 4,4'-disulfonyl chloride with an amine containing the group R" as illustrated by the following reaction:

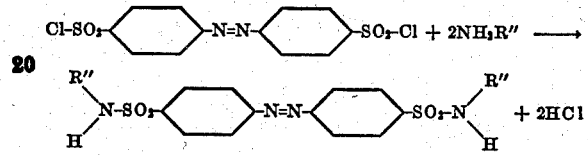

The hydrogen chloride produced as the by-product is combined with an excess of the amine or with an added alkali such as sodium hydroxide, alkali being present at all times during the reaction so as to maintain the pH above 7.

The invention comprises also the method described herein for making the hydrazo derivatives, including making the azo derivative as described followed by reduction of the azo to corresponding hydrazo compounds.

The invention comprises also making the azo and then the hydrazo derivatives as described followed by the oxidation of the hydrazo derivative, so as to give the azoxy derivatives.

These three classes of closely related compounds are illustrated more specifically in the following typical general formulas:

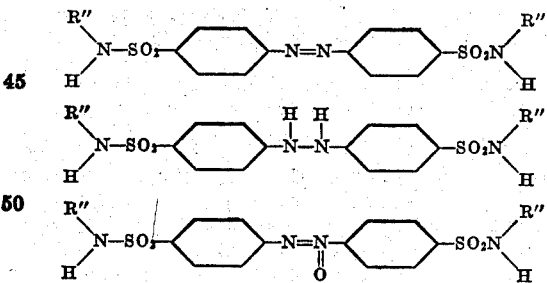

The compounds of the present invention are useful in the therapy of infectious diseases. For this purpose, the compounds are especially satisfactory when X in the general formula is hydrogen and R" is one of the four groups containing the anil linkage and whose formulas have been given.

As compared to the corresponding compounds that may be represented by the same general formulas except that no R" group is present and its place in the formulas is taken by hydrogen, halogen, sodium, or like element, the compounds of the present invention are of low solubility not only in water but also in a number of organic liquids that are good solvents for the compounds not containing the R" group.

In therapy the compounds of the present invention are slowly or difficultly soluble in the body liquids. They provide supplies or reservoirs of materials that are not rapidly consumed and give a more even and lasting effect, as well as being more specific, than the compounds that are somewhat similar but are more soluble and do not contain the R" group.

The new compounds are yellow to reddish brown in color, only slightly soluble in water and the common organic solvents, and in most cases melt with decomposition at temperatures above 300° C. They are soluble in pyridine and acetic acid and are more soluble in these solvents hot than cold. They may, therefore, be purified by crystallization from their solutions in pyridine or acetic acid. The compounds are soluble also in concentrated cold sulfuric acid in which they give yellow to orange colored solutions. They dissolve in aqueous alkali metal hydroxide solutions in which they give a solution of the corresponding alkali metal salts (derivatives) of deep red color.

Specific compounds illustrating the invention are as follows, the compounds melting with decomposition at temperatures above 300° C. except in those cases for which a lower melting point or a lower temperature of decomposition is stated.

| Compound | Melting Point, °C. |
|---|---|
| Azobenzene 4,4'-disulfonyl 2-amino pyridine | 237-8° (dec.). |
| Hydrazobenzene 4,4'-disulfonyl 2-amino pyridine | 239-40° (dec.). |
| Azoxybenzene 4,4'-disulfonyl 2-amino pyridine | 247° (dec., no melting). |
| Azobenzene 4,4'-disulfonyl 2-amino thiazole | 228-9° (dec.). |
| Hydrazobenzene 4,4'-disulfonyl 2-amino thiazole | |
| Azoxybenzene 4,4'-disulfonyl 2-amino thiazole | |
| Azobenzene 4,4'-disulfonyl 2-amino pyrimidine | |
| Hydrazobenzene 4-4'-disulfonyl 2-amino pyrimidine | |
| Azoxybenzene 4,4'-disulfonyl 2-amino pyrimidine | |
| Azobenzene 4,4'-disulfonyl guanidine | 296-7° (dec.). |
| Hydrazobenzene 4,4'-disulfonyl guanidine | 197-199°. |
| Azoxybenzene 4,4'-disulfonyl guanidine | 294-6° (dec.). |

Since the compounds and R" groups are complicated and different terminology might be applied by others, the names used herein are intended to represent the compounds or groups represented by the formulas, in the case of those compounds or groups for which formulas are given.

In making compounds of the kind described, the following general method is employed.

GENERAL METHOD FOR AZO DERIVATIVES

Azobenzene 4,4'-disulfonyl chloride is dissolved in an organic solvent that is not a solvent for the azo derivative to be made. There is then added a primary amine in which the organic radical present is the R" group. There is added either an excess of the amine or an additional alkali, as, for example, sodium or potassium hydroxide so as to establish alkalinity during all stages of the reaction. The mixture is then reacted, either by being boiled under a reflux condenser or by being stirred at a low temperature, in those cases in which reaction occurs at a satisfactory rate at low temperatures, until there is precipitated the crude form of the desired substitution product and until no substantial additional quantity of such precipitate is formed. The crude compound is then separated from the liquid present, as by decantation, filtration, or centrifuging.

The crude material may then be subjected to purification by recrystallization and advantageously by conversion to an alkali metal salt, purifying the salt by recrystallization, and then precipitating the desired compound by acidification. Thus, the crude compound may be dissolved in a warm aqueous solution of sodium hydroxide, the resulting solution of the sodium salt filtered, the filtrate mixed with a large volume of acetone, and the resulting mixture allowed to stand, whereupon the sodium derivative is deposited in solid condition. The sodium compound thus obtained is separated from the remaining liquid and dried, say by filtration and drying in vacuo at about 100° C. or other temperature below the temperature of decomposition of the material to give a solid, readily water-soluble product.

Any other alkali metal hydroxide or carbonate may be used in place of sodium hydroxide, in this purification. In this manner there may be made the potassium or lithium salt, for example.

The alkali metal compounds so made and purified may be used as such in therapy in cases in which a soluble material is satisfactory or desirable.

To prepare such compounds in purified condition, the sodium derivative made as described is dissolved in water. There is then added an acid, such as dilute sulfuric, hydrochloric, or acetic, in amount at least equivalent to the sodium present. The sodium is thus replaced by hydrogen, the reaction involving the reacting materials only being represented as follows:

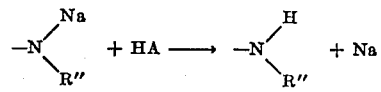

A representing in this reaction the radical of the acid used, such as SO$_4$, Cl, or CH$_3$COO.

In place of the benzene used as solvent in the method described above, there may be used toluene, petroleum ether, chloroform, carbon tetrachloride, pyridine, or like solvents meeting the general requirements stated. The solvent used should be chemically inert towards all reagents present except hydrogen chloride that is formed as a by-product of the reaction, to which hydrogen chloride the solvent may or may not be inert. Pyridine is particularly desirable as a solvent because it combines with the hydrogen chloride so as to remove one of the reaction products.

GENERAL METHOD FOR HYDRAZO DERIVATIVES

The general method of making the hydrazobenzene derivatives includes making the azo derivatives by the method described above, followed by reduction of the azo group by a reducing agent, as for example, by sodium hydrosulfite.

The hydrazo derivatives so formed may be purified by the method described for purifying the azo derivatives.

GENERAL METHOD FOR AZOXY DERIVATIVES

The general method of forming the azoxy derivatives includes the steps described for making the hydrazo derivatives followed by oxidation of the hydrazo derivatives to give the azoxy groups, the oxidation being effected by a mild oxidation agent such as hydrogen peroxide, a ferric salt, or potassium ferricyanide.

The reduction and oxidation reactions in the above general methods apply only to the nitrogen bridge and may be stated as follows:

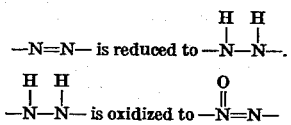

The general methods are further illustrated by the following examples of the making of specific compounds of the present invention.

EXAMPLE I

*Azobenzene 4,4'-disulfonyl 2-amino pyridine*

11.4 parts of azobenzene 4,4'-disulfonyl chloride were dissolved in 350 parts benzene as solvent, and 12.8 parts of 2-amino pyridine added, proportions here and elsewhere herein being expressed as parts by weight. The resulting solution was refluxed for three hours and allowed to cool. The resulting orange colored precipitate was filtered off. It was very slightly soluble in water and organic solvents but could be recrystallized from pyridine or acetic acid.

It was best purified by means of its sodium derivative as follows: The crude compound was dissolved in warm 10% aqueous sodium hydroxide solution and the solution filtered. An excess of acetone was added to the filtrate; as the filtrate stood the sodium derivative was deposited. Further purification was effected by redissolving the deposited material in water, filtering, and reprecipitating from the clear filtrate by the addition of acetone. The resulting material was dried in vacuo at 100° C., the product being an orange colored solid that is readily soluble in water. Analysis: 8.12% Na. Calculated 8.01%.

Acidification of an aqueous solution of the sodium derivative resulted in the precipitation of the desired amide in the form of an orange colored, high melting solid. Dried at 80° C., the substance contained 15.52% N. Calculated for azobenzene 4,4'-disulfonyl 2-amino pyridine ($C_{22}H_{18}O_4N_6S_2.2H_2O$) 15.80% N, the formula and analysis being for the dihydrate.

EXAMPLE II

*Azobenzene 4,4'-disulfonyl 2-amino thiazole*

This compound was prepared by the method of Example I, using 2-amino thiazole in place of the 2-amino pyridine and a different solvent. The materials used were 10 parts azobenzene 4,4'-disulfonyl chloride, 350 parts chloroform as solvent, and 10.6 parts 2-amino thiazole. The purified product contained 15.80% N. Calculated for $C_{18}H_{14}O_4N_6S_4.2H_2O$ 15.40% N.

EXAMPLE III

*Azobenzene 4,4'-disulfonyl 2-amino pyrimidine*

This compound was prepared as above, using 10 parts azobenzene 4,4-disulfonyl chloride, 5 parts 2-amino pyrimidine, and 350 parts pyridine as solvent,

EXAMPLE IV

*Azobenzene 4,4'-disulfonylguanidine*

To a solution of 65 parts of potassium hydroxide in 75 parts of water was added 1150 parts of acetone. With constant stirring, 76 parts of guanidine hydrochloride and then 38 parts of azobenzene 4,4'-disulfonyl chloride were added and the mixture stirred for two hours. The condensation product was filtered off, washed thoroughly with acetone, and then washed with water to remove impurities. It was crystallized from acetic acid in the form of orange platelets. Analysis: Found 23.98% N. Calculated for $C_{14}H_{16}O_4N_8S_2.2H_2O$, 24.40% N. This compound does not form a sodium derivative.

EXAMPLE V

*Hydrazobenzene 4,4'-disulfonyl guanidine*

15 parts of azobenzene 4,4'-disulfonylguanidine was dissolved in 700 parts of 0.2 normal potassium hydroxide solution, with heating. When the solution had been heated to about 100°, sufficient sodium hydrosulfite as reducing agent was added over a period of five minutes to decolorize the solution. Upon cooling, the solution deposited an oily semi-solid material. This semi-solid was readily crystallized from water containing about 5% acetone. The recrystallization gave white crystals of hydrazobenzene 4,4'-disulfonyl guanidine, melting at 196°. This compound does not form a sodium derivative.

EXAMPLE VI

*Hydrazobenzene 4,4'-disulfonyl 2-amino pyridine*

This compound was prepared from 15 parts of azobenzene 4,4'-disulfonyl 2-amino pyridine, 700 parts of 0.2 normal potassium hydroxide solution, and a slight excess of sodium hydrosulfite, by reduction as described in Example V. The crude product obtained by acidification of the solution with acetic acid was purified by reprecipitating the solution of its sodium derivative with acetic acid, to give a slightly yellowish-orange colored amorphous solid.

EXAMPLE VII

*Hydrazobenzene 4,4'-disulfonyl 2-amino thiazole*

13.5 parts of azobenzene 4,4'-disulfonyl 2-amino thiazole was reduced as in Example V, using 700 parts of 0.2 normal potassium hydroxide solution and a slight excess of sodium hydrosulfite. The desired product was obtained by acidification of the clear solution with acetic acid. It was purified by resolution in dilute alkali and reprecipitation by acetic acid, to give a slightly orange-brown colored amorphous solid.

EXAMPLE VIII

*Hydrazobenzene 4,4'-disulfonyl 2-amino pyrimidine*

This compound was prepared as in Example V from 10 parts of azobenzene 4,4'-disulfonyl 2-amino pyrimidine, 500 parts of 0.2 normal potassium hydroxide solution, and an excess of alkaline solution of sodium hydrosulfite. The product was a slightly colored amorphous solid.

EXAMPLE IX

*Azoxybenzene 4,4'-disulfonyl 2-amino thiazole*

10 parts of azobenzene 4,4'-disulfonyl 2-amino thiazole was heated for several hours with 60 parts of 30% hydrogen peroxide as oxidizing agent and 240 parts of glacial acetic acid as solvent.

The product isolated was purified by precipitation of its sodium derivative with the addition of acetic acid. The purified product was very slightly soluble in water, and was obtained in the form of yellowish-tan colored amorphous powder.

EXAMPLE X

*Azoxybenzene 4,4'-disulfonyl 2-amino pyridine*

This compound was prepared and purified as in Example IX, using 10 parts of azobenzene 4,4'-disulfonyl 2-amino pyridine, 60 parts of 30% hydrogen peroxide, and 240 parts of glacial acetic acid. The purified compound was obtained in the form of tiny golden brown crystals, insoluble in water and most organic solvents.

EXAMPLE XI

*Azoxybenzene 4,4'-disulfonyl guanidine*

This compound was prepared by the method of Example IX using 10 parts of hydrazobenzene 4,4'-disulfonyl guanidine, 60 parts of 30% hydrogen peroxide, and 240 parts glacial acetic acid. The product obtained was an orange-brown colored amorphous powder, very slightly soluble in water and most organic solvents. It did not form a water soluble sodium derivative.

EXAMPLE XII

*Azoxybenzene 4,4'-disulfonyl 2-amino pyrimidine*

This compound was prepared by the method of Example IX from 10 parts of hydrazobenzene 4 4'-disulfonyl 2-amino pyrimidine, 60 parts of 30% hydrogen peroxide, and 240 parts of glacial acetic acid.

It will be understood that the details given are for the purpose of illustration and that variations within the spirit of the invention are intended to be included within the scope of the appended claims.

What we claim is:

1. A composition of matter comprising the compound of the general formula

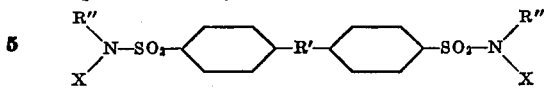

X representing a monovalent element selected from the group consisting of hydrogen and an alkali metal, R' representing a nitrogen bridge selected from the group consisting of the hydrazo, azo, and azoxy radicals having the formulas

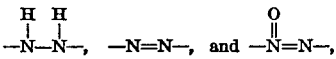

respectively, and R'' representing the 2-thiazolyl group.

2. A composition of matter as described in claim 1, X representing an alkali metal.

BERNARD J. LUDWIG.
FRANZ C. SCHMELKES.

REFERENCES CITED

The following references are of record in the file of this patent:

UNITED STATES PATENTS

| Number | Name | Date |
|---|---|---|
| 2,254,191 | Roblin | Aug. 26, 1941 |
| 1,534,512 | Fritzsche | Apr. 21, 1925 |
| 2,097,414 | Kharasch | Oct. 26, 1937 |

FOREIGN PATENTS

| Number | Country | Date |
|---|---|---|
| 517,272 | Great Britain | Jan. 25, 1940 |

OTHER REFERENCES

Scudi, Journal Amer. Chem. Soc., vol. 59, pages 1480–1482 (1937). (Copy in Pat. Off. Libr.)

Mayer, Biologie Medicale, Supp. 1937, vol. 27, pages 82–85, 260–397.7. (Copy in Div. 6).